United States Patent
Ishii et al.

[11] Patent Number: 6,149,197
[45] Date of Patent: Nov. 21, 2000

[54] STRUCTURE OF FRONT BODY OF AUTOMOBILES

[75] Inventors: Yoshitake Ishii; Mitsuru Yuda, both of Hamamatsu, Japan

[73] Assignee: Suzuki Motor Corporation, Shizuoka-Ken, Japan

[21] Appl. No.: 09/089,020

[22] Filed: Jun. 2, 1998

[30]   Foreign Application Priority Data

Jun. 6, 1997  [JP]  Japan ................................ 9-148982
Oct. 14, 1997 [JP]  Japan ................................ 9-279276

[51] Int. Cl.⁷ ........................................... B62D 21/11
[52] U.S. Cl. .................. 280/788; 280/784; 280/93.515; 296/204
[58] Field of Search ..................... 280/788, 781, 280/784, 785, 795, 93.515; 180/232, 299; 296/194, 204, 188, 199, 38

[56]           References Cited

U.S. PATENT DOCUMENTS

| 3,441,289 | 4/1969 | Frantz et al. . | |
| 3,578,782 | 5/1971 | Miyoshi | 180/232 |
| 3,774,712 | 11/1973 | Froumajou | 180/232 |
| 4,314,710 | 2/1982 | Kamoshita et al. | 280/96 |
| 4,406,343 | 9/1983 | Harasaki | 180/297 |
| 4,723,810 | 2/1988 | Kanemaru et al. | 296/185 |
| 4,822,096 | 4/1989 | Fujii | 296/194 |
| 4,899,843 | 2/1990 | Takano et al. | 180/312 |
| 5,251,932 | 10/1993 | Ide | 280/784 |
| 5,280,957 | 1/1994 | Hentschel et al. | 280/788 |
| 5,385,369 | 1/1995 | Mukai et al. | 280/788 |
| 5,611,569 | 3/1997 | Sekiguchi et al. | 280/788 |
| 5,613,709 | 3/1997 | Nakamichi | 280/777 |
| 5,915,494 | 6/1999 | Matsumura et al. | 180/232 |

*Primary Examiner*—Paul N. Dickson
*Attorney, Agent, or Firm*—Fish & Richardson P.C.

[57]           ABSTRACT

Provided is a structure of a front body of an automobile comprising a steering system which can prevent a steering gear case from coming in contact with a road surface during running on a bad road or the like even if an under cover is not provided, and which can reduce costs, weight and size, and can provide proper (small) changes in the toe angle and the driver with a smooth sense of steering. In the front body of an automobile in which the suspension arm (lower control arm) and the steering gear case (pinion case) are attached to the suspension frame and at least a part of the steering gear case (for example, a pinion case) is placed below the suspension frame, a downward protrusion which protrudes downward and has a face slanted downward toward the rear portion of the automobile body is provided on the bottom portion of the suspension frame.

7 Claims, 10 Drawing Sheets

STRUCTURE OF FRONT BODY OF AUTOMOBILES

BACKGROUND OF THE INVENTION AND RELATED ART STATEMENT

1. Field of the Invention

The present invention relates to a structure of a front body of an automobile, and more particularly to a structure of a suspension frame of a strut type suspension provided on the front body of the automobile.

2. Description of Related Art

In a case where a suspension provided on the front body of an automobile is a double wishbone type, proper changes in the toe angle of tires can be obtained even if a steering gear case is placed at a position higher than the cross member and the suspension frame of the body to which a steering gear case is attached. For example, also in a case where the steering gear case (a pinion case) 33 is attached through a mount bracket 31 and a fixture 32 to an upper face of a suspension frame 30 fixed to the body frame so that the steering gear case 33 is placed at a position higher than the suspension frame 30 as shown in FIG. 10, proper changes in the toe angle of the tires can be obtained.

On the other hand, if the suspension is a strut type, a position in which the steering gear case is placed should be set as low as possible and the length of a tie-rod should be increased with respect to a lower control arm in order to obtain proper changes in the toe angle of the tires. For this reason, in an automobile having a strut type suspension, the steering gear case 33 is attached to the rear face of the suspension frame 30 through a mount member 34, and the lower portion of the steering gear case 33 is provided below the suspension frame 30 as shown in FIG. 11.

However, if the steering gear case 33 is placed in a low position in a layout in which the steering gear case 33 is provided in front of the front wheels, there is a possibility that a disorder might be caused; for example, the steering gear case 33 might come in contact with a road surface while fairing bad road conditions. Therefore, an under guard 36 has conventionally been provided below the steering gear case 33 between the suspension frame 30 and the cross member 35 of the body frame in order to protect the steering gear case 33 as shown in FIG. 11.

FIG. 12 shows a position at which an A-shaped lower control arm 71 is attached to the front suspension. The lower control arm 71 connects the tire 72 (or wheel) and the frame 73. The frame 73 is attached to the main frame or the suspension frame which is not shown.

FIG. 13 shows the connection between the lower control arm 71 and the frame 73. As shown in FIG. 13, mount brackets 74 and 75 of the lower control arm 71 are fixed to the frame 73 by welding. The lower control arm 71 holds bush portions 71a and 71b between protruding pieces of the mount brackets 74 and 75 so that a bolt 76 and a nut 77 are tightened as shown in FIG. 14.

As shown in FIG. 13, the mount brackets 74 and 75 of the lower control arm 71 are welded to the frame 73 respectively as described above. By the influence of heat or the like, therefore, it is difficult to obtain an accurate dimension indicated at L1 between the mount brackets 74 and 75. Furthermore, a lower control arm 71 also has parts such as bushes fitted in the bush portions 71a and 71b by pressure so that a dimension indicated at L2 can be obtained accurately only with some difficulty.

For this reason, a clearance s is provided such that the bush portions 71a and 71b can easily be attached to the mount brackets 74 and 75 even if the dimensions are not precise when they are to be attached.

With the structure of the front body shown in FIGS. 10 and 11, the under cover 36 needs to be provided as a separate member in order to protect the steering gear case 33. Therefore, the number of parts and assembly efforts are increased, and the weight of the body increases. Furthermore, it is necessary to cause a steering pinion 37 (see FIGS. 10 and 11) to approach a portion of the inside of the body (a central side of the body) in order to set the tie-rod as long as possible. In this case, however, the joint angle of the connecting portion with the steering column increases so that steering force fluctuates more greatly, resulting in a poor sense of steering.

On the other hand, it may be considered to move a steering rack shaft (not shown) upward so that the steering gear case 33 is placed at a higher position in order to protect the steering gear case 33. In this case, the length of the tie-rod needs to be increased in order to properly change the toe angle. Correspondingly, the length of the steering rack shaft is relatively decreased. Consequently, the required steering turn angle cannot be obtained.

With the structure of the front body shown in FIGS. 13 and 14, when the mount brackets 74 and 75 and the bush portions 71a and 71b are fastened with the bolt 76, the mount brackets 74 and 75 should also be fastened to close clearance s. Therefore, the mount brackets 74 and 75 are deformed and large tightening torques are required. Furthermore, even after the lower control arm is mounted, the bolt 76 and the nut 77 may become loose, and the internal stress of the mount brackets 74 and 75 may disadvantageously occur.

As shown in FIG. 15, furthermore, dimensional errors between a mounting point a of a ball joint of the lower control arm and a point b of the rack and pinion of the steering also increase so that the accuracy of alignment is reduced.

OBJECT AND SUMMARY OF THE INVENTION

In consideration of such problems, it is an object of the present invention to provide the structure of the front body of an automobile comprising a steering system which can prevent the steering gear case from coming in contact with road surfaces when driving under rough road conditions or the like even if an under cover is not provided and the steering gear case is placed at a low position, and which can reduce costs, weight and size, obtain proper (small) changes in the toe angle, and provide the driver with a smooth sense of steering.

It is another object of the present invention to provide the structure of the front body of an automobile which can easily attach to the lower control arm without deformation of the mount bracket of the lower control arm even if clearance s shown in FIG. 13 is not provided.

In order to attain the above-mentioned objects, a first aspect of the present invention is directed to a structure of the front body of an automobile in which the suspension arm and the steering gear case are attached to the suspension frame and at least a part of the steering gear case is placed below the suspension frame, wherein a downward protrusion which has a face which is downward slanted toward the rear portion of the automobile is provided on the bottom portion of the suspension frame.

A second aspect of the present invention is directed to the structure of the front body of an automobile wherein the lowermost end of the downward protrusion is located at a position lower than the lowermost end of the steering gear case.

Third and fourth aspects of the present invention are directed to the structure of the front body of an automobile wherein a plurality of downward protrusions are formed on the bottom portion of the suspension frame, and at least one of the downward protrusions is placed at a position forward of the steering gear case in the front body.

A fifth aspect of the present invention is directed to a structure of a front body of an automobile comprising a pair of main frames provided in a longitudinal direction of a body, a suspension frame provided on the front side of the main frames in the lateral or horizontal direction, and the lower control arm which suspends a wheel from the suspension frame and the main frame and which has the bush portion attached to a mount bracket provided on each main frame and each suspension frame, wherein the suspension frame is attached to the main frames such that its position can be adjusted in the longitudinal direction of the automobile, and the position of the mount bracket of the suspension frame can be matched to that of the bush portion when the lower control arm is attached.

DETAILED DESCRIPTION OF PREFERRED EMBODIMENTS

A first embodiment of the present invention will be described below with reference to FIGS. 1 to 5.

Figure 1:
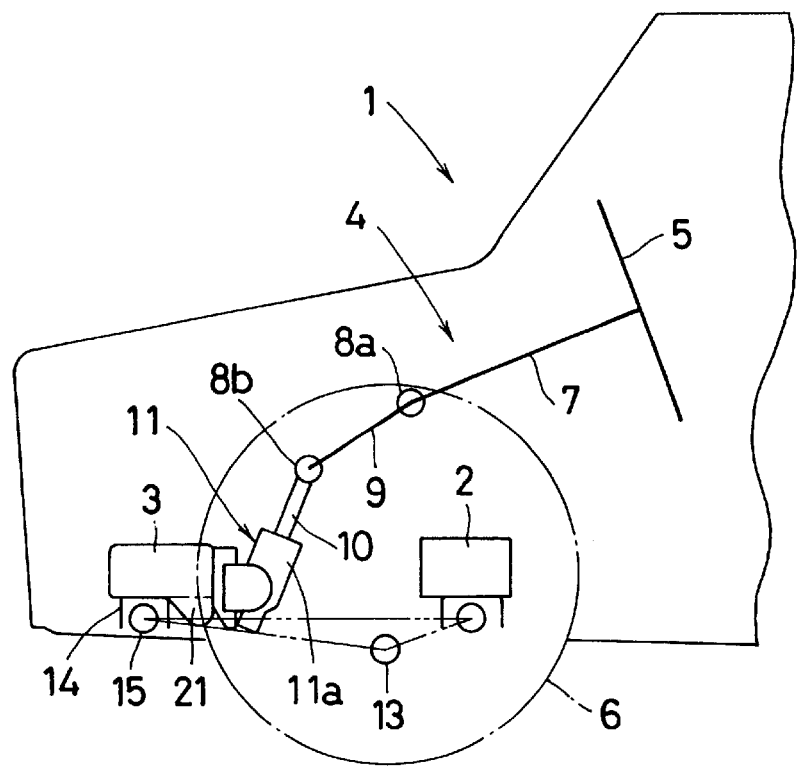
FIG. 1 is a side view showing the structure of the front body of a four-wheeled vehicle according to a first embodiment of the present invention.
Figure 2:
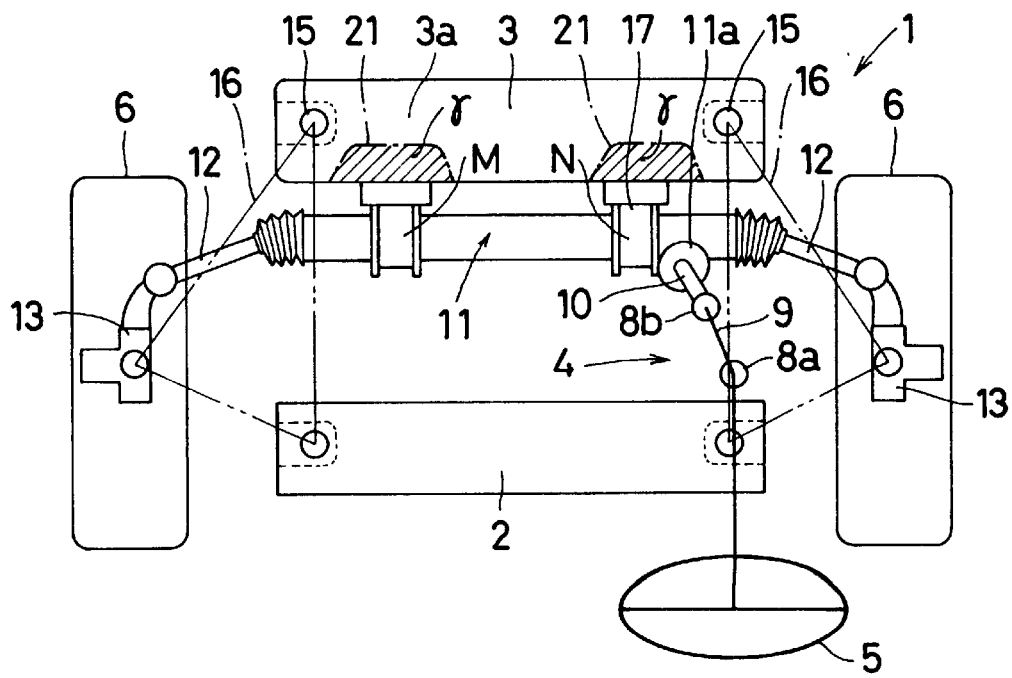
FIG. 2 is a plan view showing the structure of the front body described above.

FIGS. 1 and 2 show a structure of the front body of a four-wheel vehicle 1 having a strut type front suspension. In FIGS. 1 and 2, reference numeral 2 denotes a cross member forming the body frame, reference numeral 3 denotes a suspension frame fixed to the body frame in almost parallel with the cross member 2 in a position forward thereof, and reference numeral 4 denotes a steering mechanism for transmitting rotating force of the steering handle 5 to the front wheel 6 to perform steering of the front wheel 6.

As clearly shown in FIG. 2, the above-mentioned steering mechanism 4 comprises a steering shaft 7 connected to the steering handle 5, a connecting shaft 9 connected to the steering shaft 7 through a universal joint 8a, a steering pinion 10 connected to the connecting shaft 9 through a universal joint 8b, a steering rack shaft (not shown) in a steering gear case 11 which is engaged with the steering pinion 10, a tie-rod 12 connected to the steering rack shaft (steering gear), and a knuckle 13 attached to the front wheel 6. The rotating force of the steering handle 5 is sequentially transmitted to the front wheel 6 through each member.

The steering gear case 11 is placed in almost parallel with the suspension frame 3 at a forward position with respect to the cross member 2 in the rear of the suspension frame 3. A bush 15 is attached to lower faces on both ends of the suspension frame 3 through a bracket 14 (see FIG. 3). A lower control arm 16 is rotatably provided between the bush 15 and the knuckle 13 (see FIGS. 1 to 4).

Figure 3:
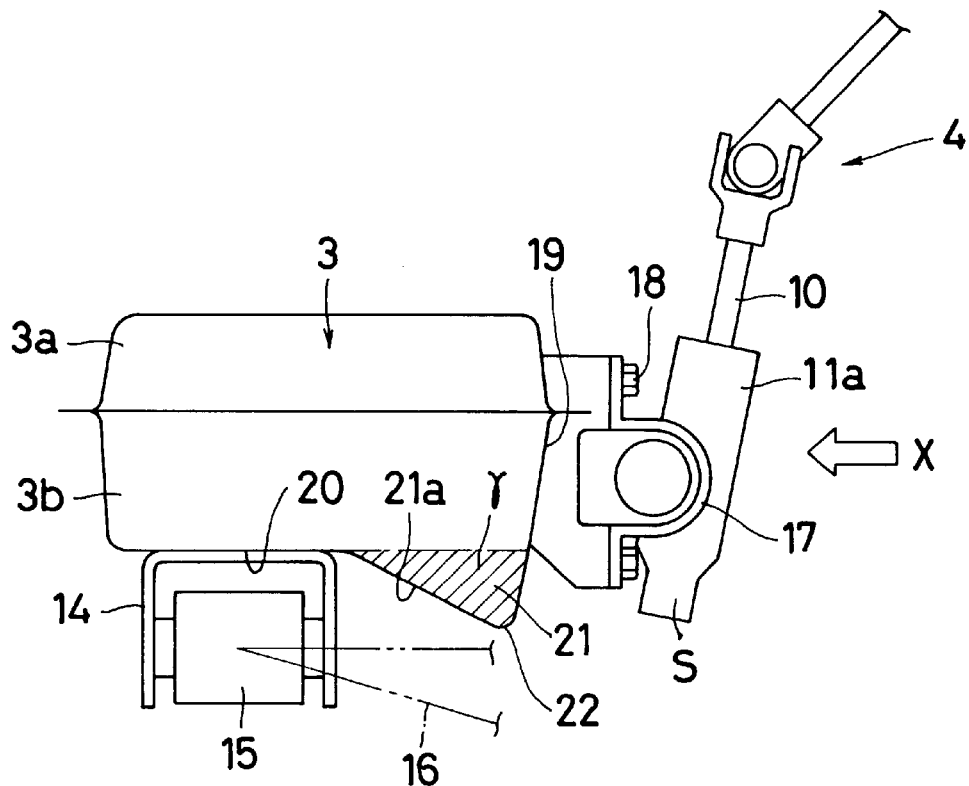
FIG. 3 is a side view showing the steering gear case (a pinion case) attached to a suspension frame.
Figure 4:
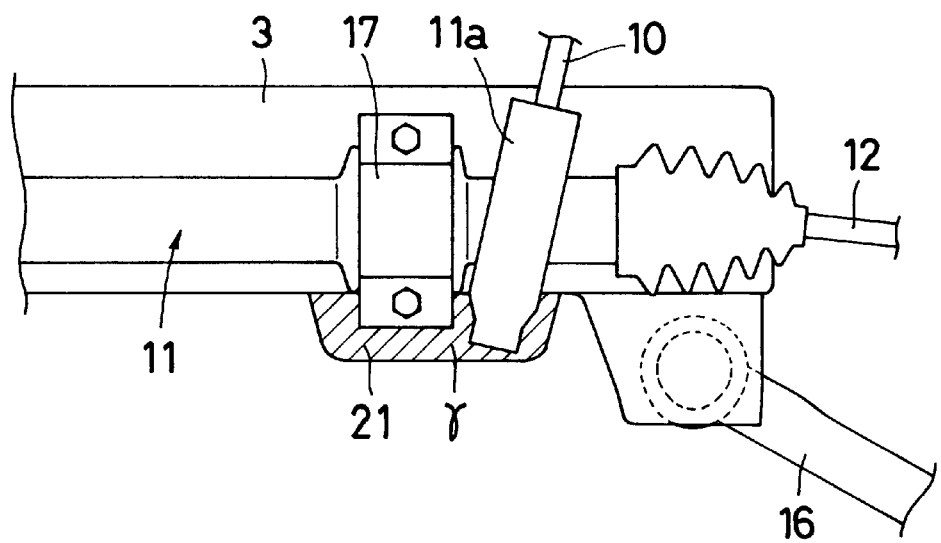
FIG. 4 is a front view seen from the direction of arrow X in FIG. 3.
Figure 5A:
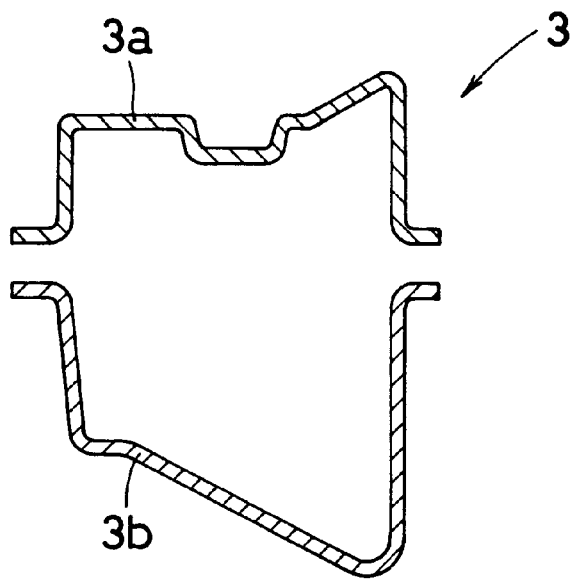
FIG. 5 (A) is a sectional view illustrating the structure of the suspension frame, in which an upper half member and a lower half member that form the suspension frame are obtained by division respectively, and FIG. 5 (B) is a side view showing the suspension frame formed by a combination of the upper and lower half members.
Figure 5B:
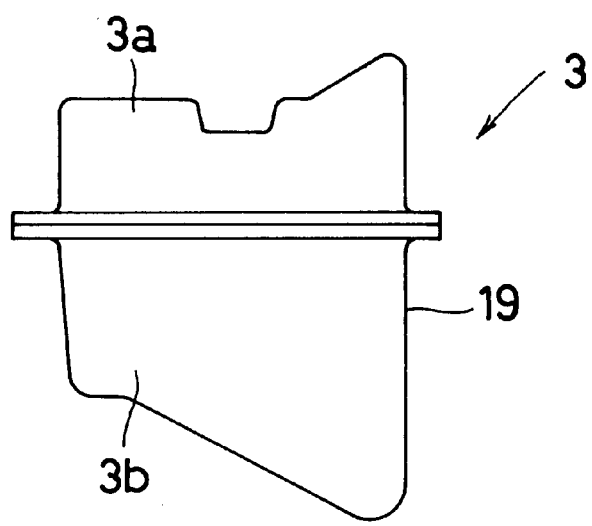

For example, the suspension frame 3 according to the present embodiment includes press formed upper and lower half members 3a and 3b which are obtained by vertical division into two portions as shown in FIG. 5 (A). The upper half member 3a and the lower half member 3b are combined with each other as shown in FIG. 5 (B) so that the suspension frame 3 having a closed sectional shape is formed. A steering pinion case 11a acting as a part of the steering gear case 11 is fastened and fixed to a rear face portion 19 of the suspension frame 3 with a fixture 17 and a bolt 18 as shown in FIG. 3, and a lower portion S of the steering pinion case 11a protrude downward beyond a bottom portion 20 of the suspension frame 3 such that the steering pinion case 11a can be positioned at a lower position.

On the other hand, a downward protrusion 21 is provided by integral forming (bending) in a bottom portion of the lower half member 3b of the suspension frame 3, that is, the bottom portion 20 of the suspension frame 3. The downward protrusion 21 protrudes downward in a plurality of portions (for example, two portions shown by an oblique line γ in FIG. 2) in a longitudinal direction (a lateral direction of a body), and includes a slanted face 21a having a shape which is slanted downward as it approaches a rear portion of the body. A rearmost end of the bottom portion 20 acts as a lowermost end 22 of the suspension frame 3.

Thus, the downward protrusion 21 of the suspension frame 3 which is conceptually shown by the oblique line γ in FIGS. 1 to 4 is provided corresponding to the steering pinion case 11a acting as a part of the steering gear case 11 and front sides of a pair of portions M and N where the steering pinion case 11a is attached to the suspension frame 3 (see FIG. 2) respectively such that the lowermost end 22 of the downward protrusion 21 is positioned below the lowermost ends of the steering pinion case 11a and the portions M and N. Consequently, the downward protrusion 21 functions as an under guard against stones hitting the steering pinion case 11a and the portions M and N, and as a skid plate for preventing a road surface from coming in contact with the steering pinion case 11a and the portions M and N.

According to the structure of the front body of the automobile having the above-mentioned construction, the downward protrusion 21 which protrudes downward and has the slanted face 21a that is slanted downward as it approaches the rear portion of the body is formed integrally with the bottom portion 20 of the lower half member 3b of the suspension frame 3 supporting the steering gear case 11 and the lower control arm 16, and is caused to function as the skid plate. Due to the presence of the downward protrusion 21, therefore, generation of a disorder can surely be prevented, that is, the steering gear case 11 can surely be prevented from coming in contact with the road surface while running on a rough road.

In addition, the downward protrusion 21 is formed integrally with the suspension frame 3 by bending. Therefore, the under guard which has conventionally been provided as a separate member can be omitted. Accordingly, the number of parts and assembly man-day can be reduced so that cost can be cut down. Furthermore, the downward protrusion 21 is not provided in a whole region of the suspension frame 3 in the lateral direction of the body but is provided corresponding to necessary portions, that is, the pinion case 11a acting as the lowermost end of the steering gear case 11 and the portion where the pinion case 11a is to be attached. Also in this respect, weight and size can be reduced, and costs can be cut down.

Since the above-mentioned downward protrusion 21 is provided on the suspension frame 3, the steering gear case 11, and furthermore, a steering gear can be placed in low positions. Consequently, proper (small) changes in the toe angle can be obtained, and the joint angle of a steering column can be reduced so that a smooth sense of steering can be obtained for the driver.

A mounting structure of a suspension arm according to a second embodiment of the present invention will be described below with reference to the drawings.

Figure 6:
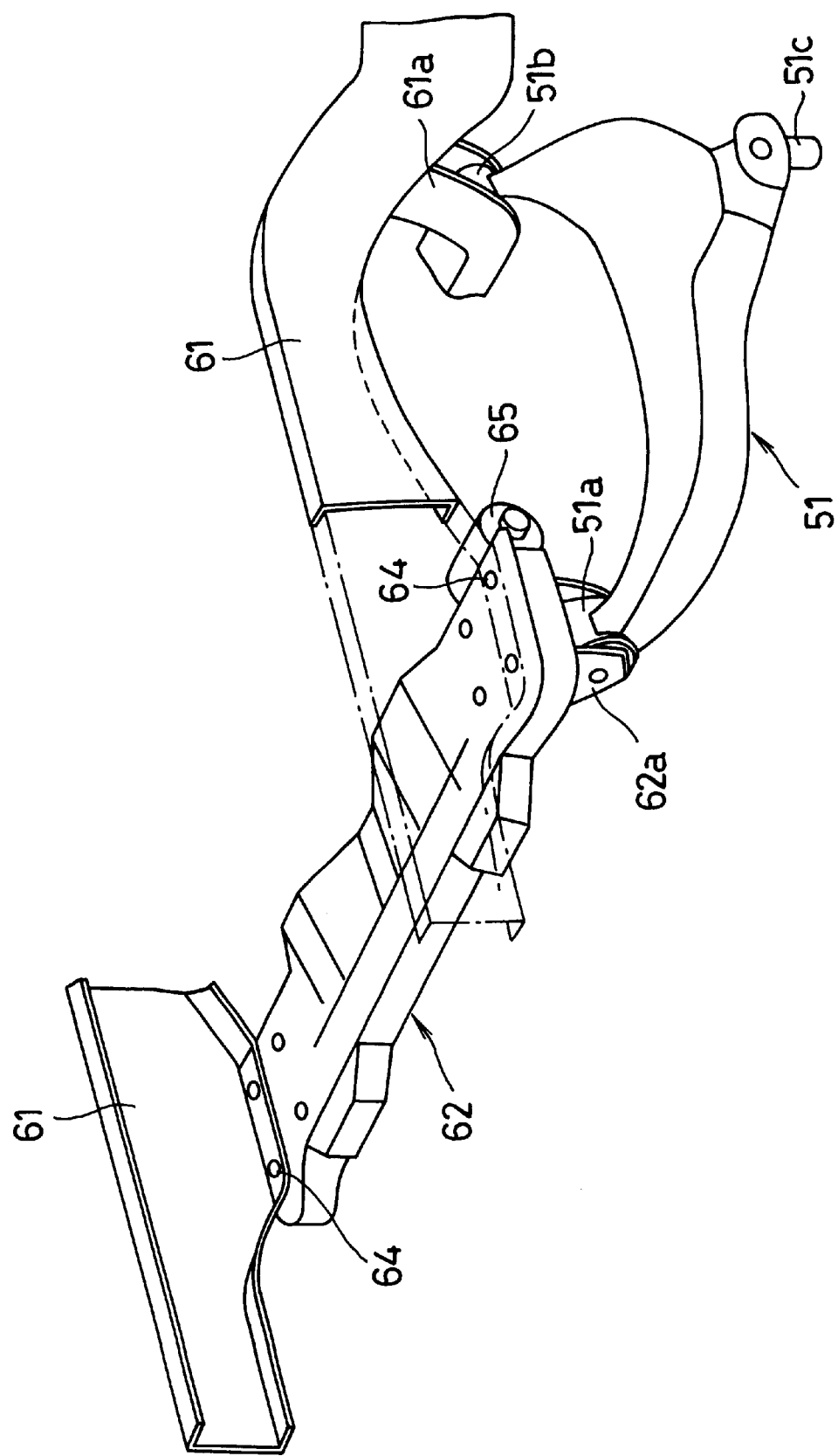
FIG. 6 is a perspective view showing the attachment of a lower control arm in a mounting structure of a suspension arm according to a second embodiment of the present invention.

A main frame 61 shown in FIG. 6 serves to mount a body of an automobile thereon, and is provided on each side and extends in a longitudinal direction of the automobile. FIG. 6 shows only a front side of the main frame 61. A suspension frame 62 provided in a lateral direction of the body is fixed to the main frame 61.

A ball joint 51c which is a mounting point on a tire side (not shown) is provided on one end of an A-shaped lower control arm 51 provided in a suspension portion. The other end of the A-shaped lower control arm 51 branches off in two in the longitudinal direction. A front bush portion 51a is fixed to the suspension frame 62, and a rear bush portion 51b is fixed to the main frame 61.

Figure 7:
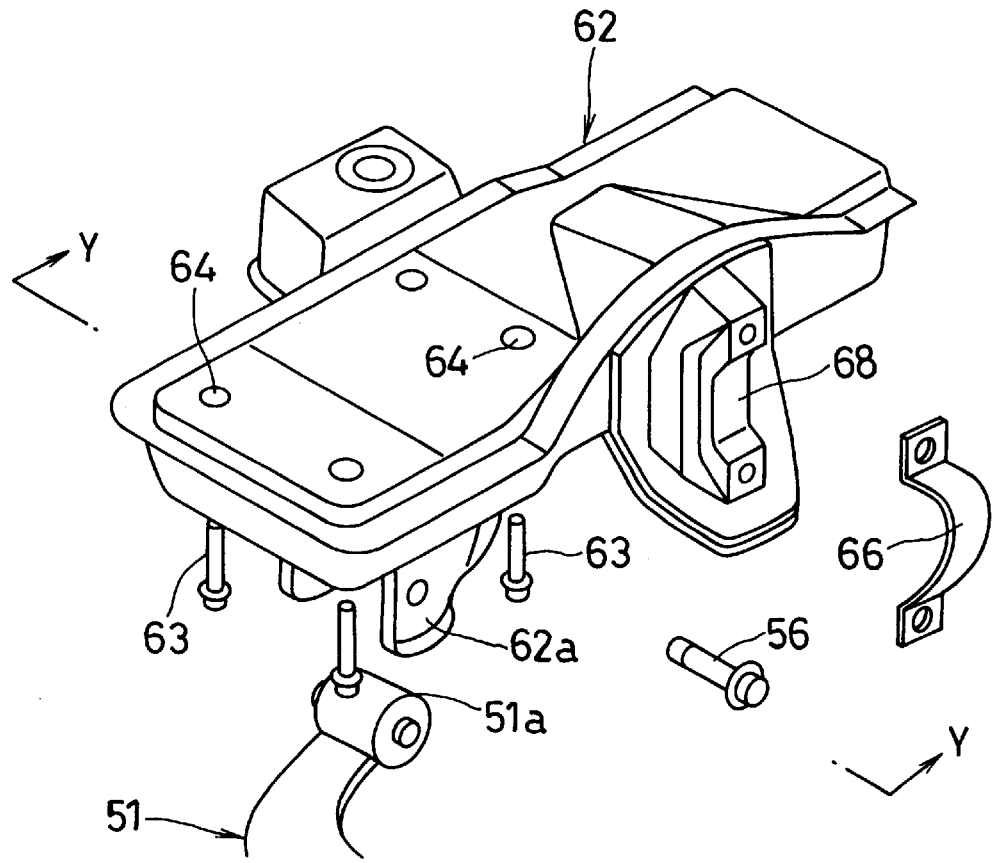
FIG. 7 is a perspective view showing a view prior to the attachment of the lower control arm to the mount bracket of the suspension frame in FIG. 6.
Figure 8:
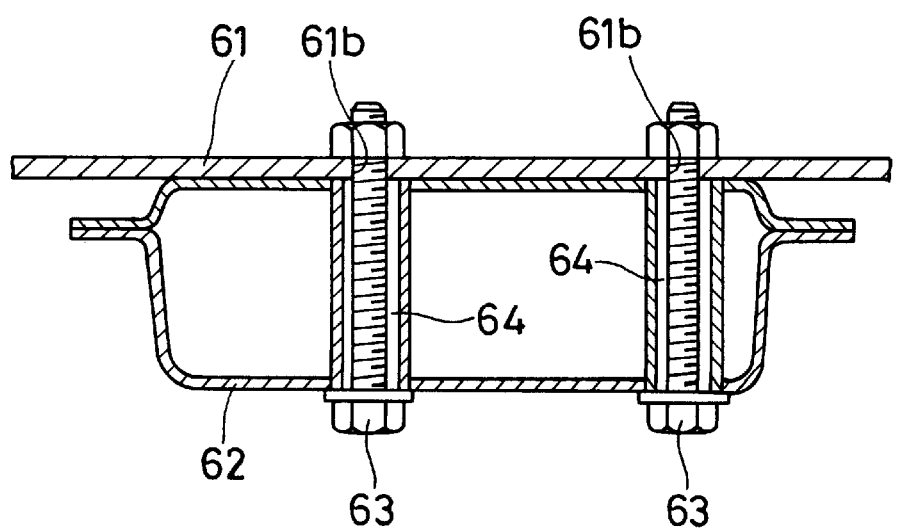
FIG. 8 is a sectional view taken along the line Y—Y in FIG. 7.

FIG. 7 shows one end of the suspension frame 62. As shown in FIG. 7, a bracket 62a of the bush portion 51a of the lower control arm 51 is fixed to the suspension frame 62 by welding. As shown in FIG. 8, the suspension frame 62 is provided with a through hole 64 in which a bolt 63 is inserted to fix the suspension frame 62 to the body side. As shown in FIG. 8, the through hole 64 has an inside diameter which is much greater than a diameter of a bolt hole 61b provided on the main frame 61 and a shaft diameter of the bolt 63.

Figure 9:
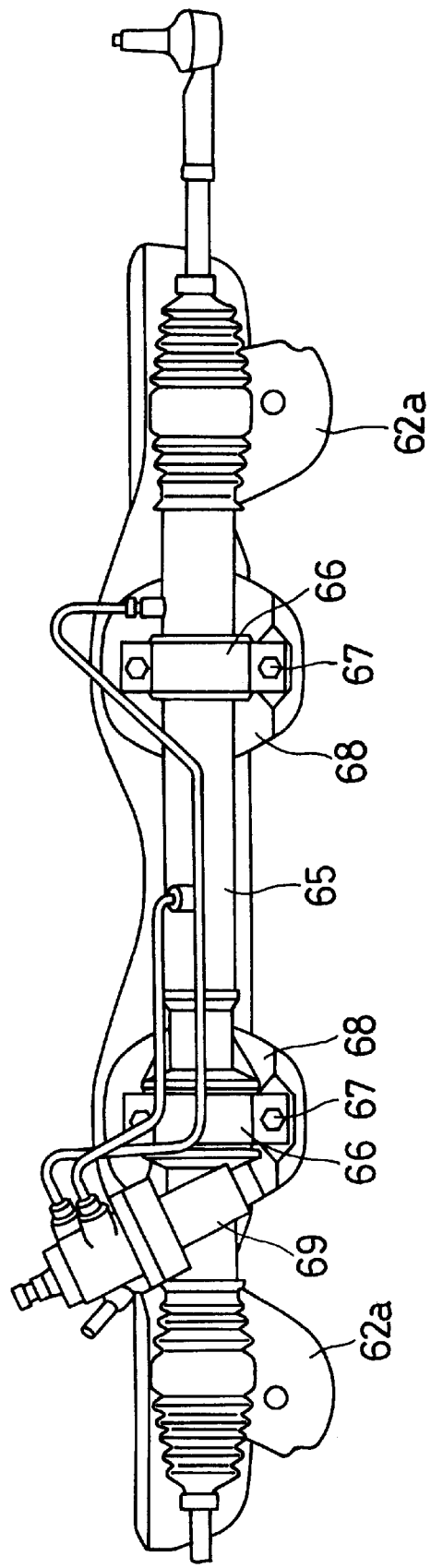
FIG. 9 is a rear elevation view showing a state in which a rack and pinion is fixed to the suspension frame in FIG. 6.
Figure 10:
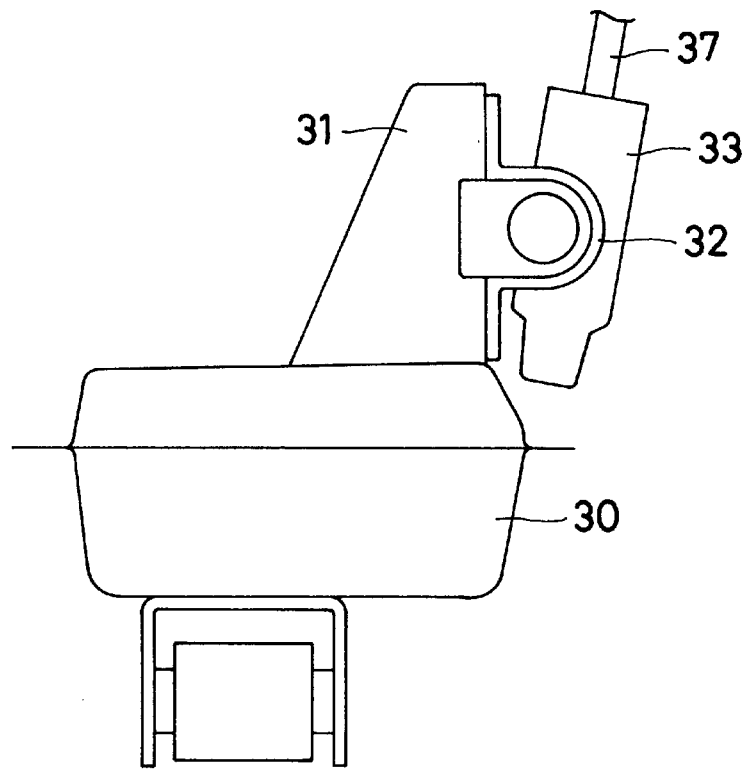
FIG. 10 is a side view illustrating the structure of the front body of the conventional four-wheeled vehicle and showing the attachment of the steering gear case (pinion case) to the suspension frame.
Figure 11:
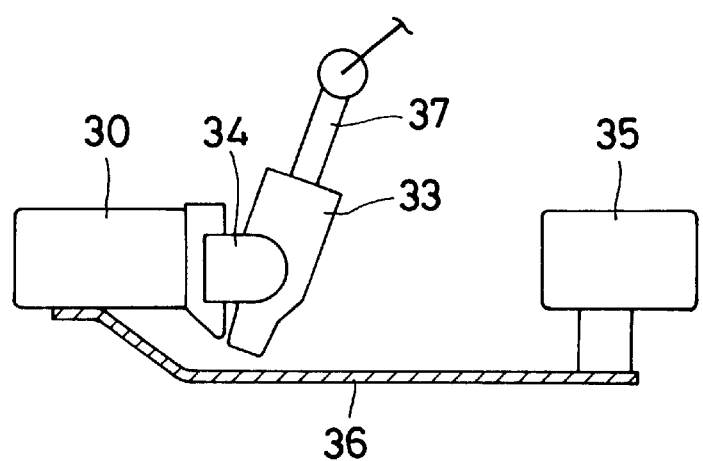
FIG. 11 is a side view illustrating a structure of the front body of another conventional four-wheeled vehicle and showing an under guard provided below a steering gear case (a pinion case)
Figure 12:
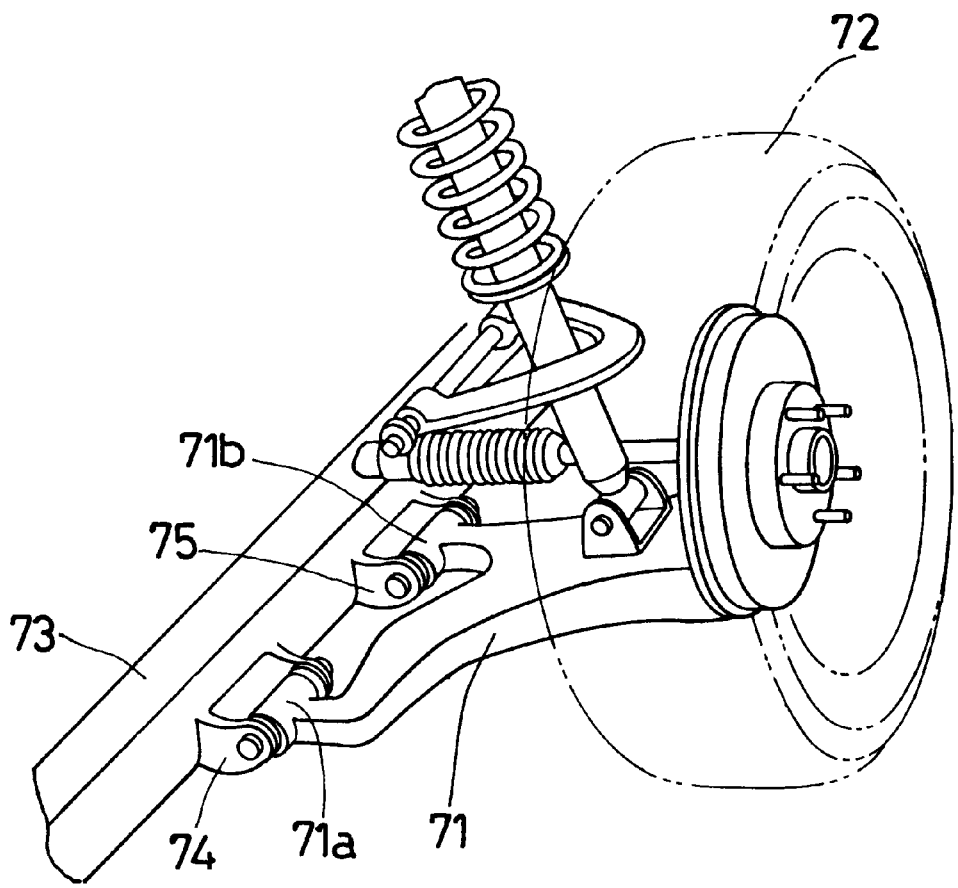
FIG. 12 is a perspective view showing a position in which a lower control arm is attached according to another conventional example.

As shown in FIG. 9, the rack and pinion 65 of the steering mechanism is positioned along the suspension frame 62 in the present embodiment. As shown in FIG. 7, a mount bracket 68 for fixing the rack and pinion 65 is provided on a rear face of the suspension frame 62. The rack and pinion 65 is attached to the mount bracket 68 with a fixture 66 and a bolt 67.

The mount bracket 68 is provided with a slanted face which is downward slanted toward the rear side of the body. The lower end of the mount bracket 68 protrudes below the suspension frame 62. A steering gear case 69 is provided on behind the rear side portion of the mount bracket 68. The lower end of the mount bracket 68 protrudes below the lower end of the steering gear case 69.

Next, an example of the procedure for attaching the lower control arm 51 will be described.

As shown in FIG. 6, when the lower control arm 51 is to be attached to the frames 61 and 62, the rear bush portion 51b is first attached to a bracket 61a of the main frame 61. In this case, the rear bush portion 51b can be tightened. Then, the front bush portion 51a shown in FIG. 7 is attached to the bracket 62a of the suspension frame 62. At this time, the suspension frame 62 is temporarily fastened to the main frame 61 with the bolt 63.

In this state, accordingly, the suspension frame 62 can be slid by a clearance provided between the through hole 64 and the bolt 63 in a longitudinal direction of the main frame 61, that is, a longitudinal direction of the body. Thus, a position of the bracket 62a of the suspension frame 62 can be matched or adapted to that of the bush portion 51a. After the bush portion 51a is temporarily fastened to the bracket 62a with a bolt 56 and is aligned, the bolts 56 and 63 for attaching the bush portion 51a and the suspension frame 62 are tightened appropriately.

Figure 13:
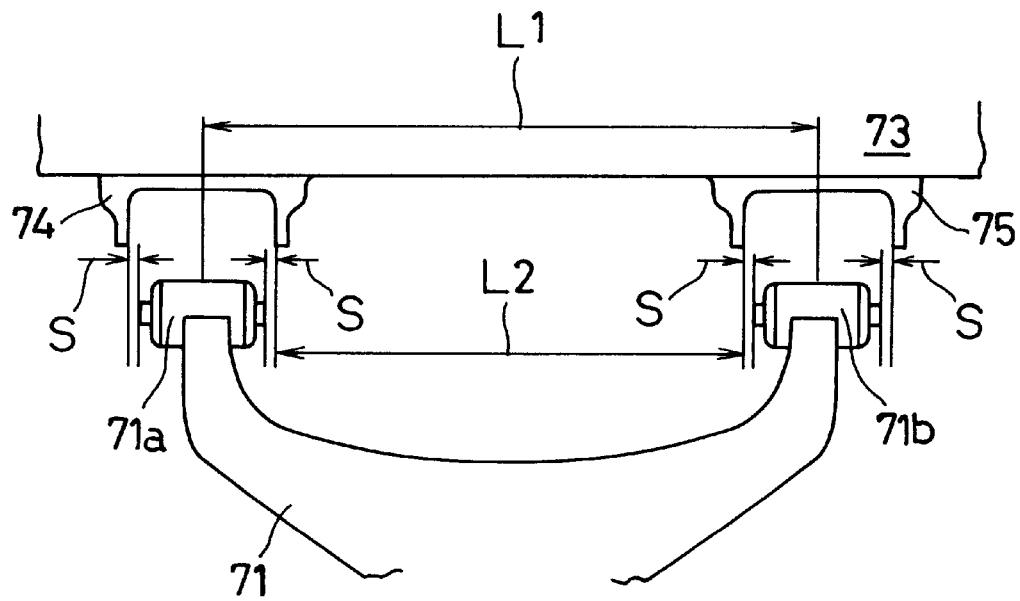
FIG. 13 is a plan view illustrating the attachment of the lower control arm according to the conventional example.
Figure 14:
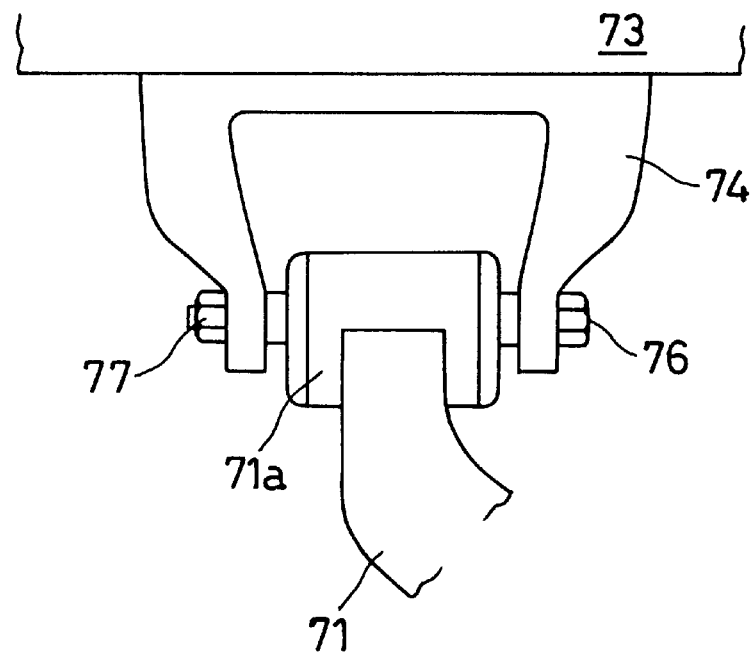
FIG. 14 is a plan view showing the lower control arm fixed to a mount bracket according to the conventional example.
Figure 15:
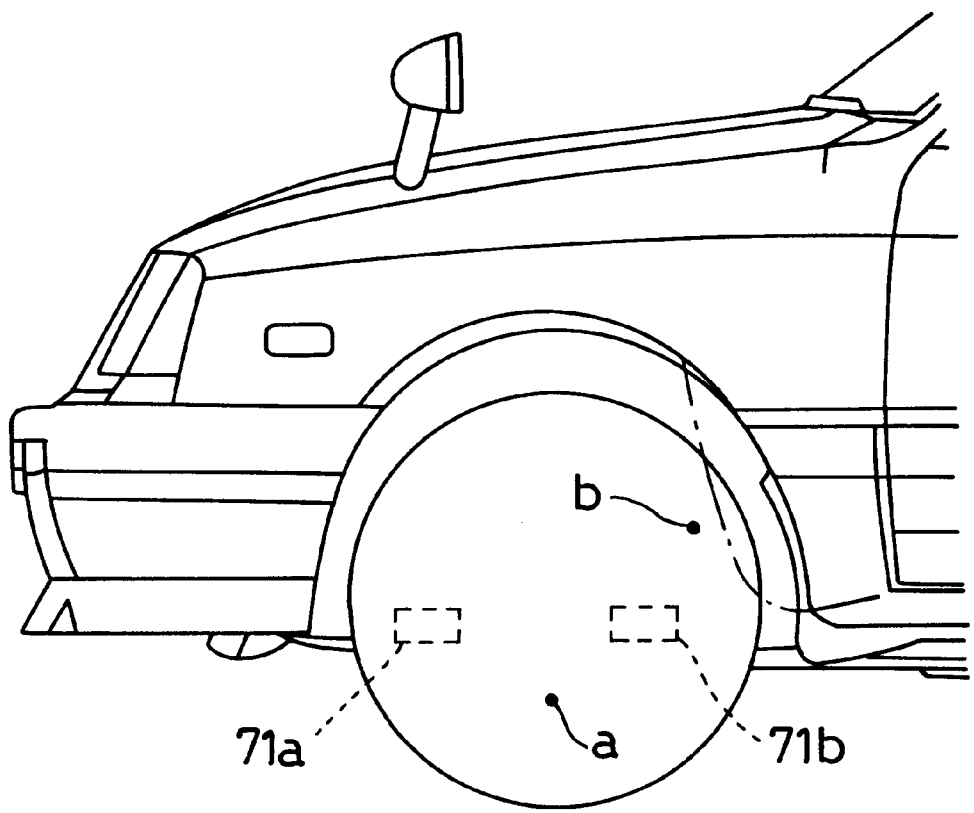
FIG. 15 is a side view showing a positional relationship between the mounting point of a ball joint of the lower control arm and the mounting point of a rack and pinion according to the conventional example.

Consequently, the bush portions 51a and 51b can be attached without deformation of their bushes. In addition, the bush portions 51a and 51b can be attached irrespective of small variations in the dimensional of L1 and L2 shown in FIG. 13, and a clearance s does not need to be increased.

When the bolt 63 is tightened, the brackets 61a and 62a are less deformed and stress applied on the bracket 62a can also be reduced. A tightening torque of the bolt 63 can also be set to a standard value so that the possibility that the bolt itself might be loosened is reduced.

Furthermore, the rack and pinion 65 is fixed to the suspension frame 62. Therefore, precision in a positional relationship between the mounting point of the ball joint 51c of the lower control arm 51 and the point of the rack and pinion 65 is enhanced.

While each embodiment of the present invention has been described above, the present invention is not restricted to the embodiments and covers a variety of changes and modifications within the scope of the present invention.

In the first embodiment, for example, the number of the downward protrusions 21 provided in the bottom portion 20 of the suspension frame 3 is not limited to 2 but can be set to 3 or more if necessary. Furthermore, any downward protrusions 21 may not be provided ahead of the steering gear case 11 in the body but a part of the downward protrusions 21 may be provided behind the steering gear case 11 in the body.

While the through hole 64 is a circle having a diameter which is much greater than the diameter of the bolt 63 in the second embodiment, it may be a slot extending in a direction which is properly adapted to the attachment of the lower control arm 51.

Although the front bush portion 51a of the lower control arm 51 has been fixed to the suspension frame 62, it may be fixed to the main frame 61 and the rear bush portion 51b may be fixed to the suspension frame 62.

The present invention has the following advantageous effects.

According to the first aspect of the present invention, the downward protrusion which protrudes downward and has a slanted face that is slanted downward as it comes closer to the rear portion of the body is provided on the bottom portion of the suspension frame supporting the suspension arm and the steering gear case. According to the present invention, therefore, the downward protrusion can function as the under guard, and the under guard which has conventionally been provided separately can be omitted. Accordingly, the number of parts and assembly man-day can be reduced, and furthermore, cost can be cut down. In addition, the above-mentioned downward protrusion can easily be formed integrally by bending the suspension frame, and costs, weight and size can be reduced.

According to the second aspect of the present invention, the lowermost end of the downward protrusion provided in the bottom portion of the suspension frame is placed in a lower position than the lowermost end of the steering gear case. According to the present invention, therefore, the lowermost end of the downward protrusion of the suspension frame comes in contact with the road surface before the road surface is likely to come in contact with the steering gear case during running on a bad road or the like. Consequently, the lowermost end portion of the downward protrusion functions as the skid plate. As a result, it is possible to prevent possible disorders; that is to say that the steering gear case can be prevented from coming in contact with the road surface.

According to the third and fourth aspects of the present invention, a plurality of downward protrusions are formed on the bottom portion of the suspension frame, and at least one of the downward protrusions is placed at a position forward with respect to the steering gear case in the automobile body. According to the present invention, therefore, the downward protrusion can function as the skid plate as described above. In addition, it is possible to prevent stones from hitting the steering gear case portion to which the downward protrusion corresponds. Thus, important parts such as the pinion case can particularly be protected.

According to the present invention, moreover, the downward protrusion is provided on the suspension frame, and the steering gear case, and furthermore, the steering gear can correspondingly be placed in the lower position of the body frame. By employing a structure in which the steering gear case is placed in the lower position of the body frame, consequently, proper (small) changes in the toe angle can be obtained and a joint angle of the steering column can be reduced, resulting in a smooth sense of steering.

According to the fifth aspect of the present invention, the position in which the suspension frame is attached can be adjusted in the longitudinal direction of the body. Therefore, the suspension frame can be moved slightly in the longitudinal direction when the lower control arm is attached. Consequently, the lower control arm can easily be attached without the deformation of the bush. In addition, clearance s shown in FIG. 13 does not need to be increased.

The bracket is less deformed when the bolt is tightened to attach the bush. In addition, stress applied on the bracket can be reduced and a tightening torque of the bolt can be set to a standard value so that the possibility that the bolt itself might be loosened can be reduced.

Furthermore, the bracket of the lower control arm becomes advantageous in respect of strength. Consequently, the cost can be cut down with a more simplified shape or an inexpensive material.

What is claimed is:

1. A structure of a front body in an automobile comprising a suspension arm and a steering gear case having points of attachment to a suspension frame, at least a part of the steering gear case being placed below a bottom portion of the suspension frame, the suspension frame having a downward protrusion on the bottom portion thereof, the downward protrusion being arranged forward of the steering gear case and forward of the points of attachment of the steering gear case, the downward protrusion having a slanted face that is slanted downward toward a rear portion of the automobile and further having a lowermost end at a position lower than a lowermost end of the steering gear case.

2. The structure of the front body in an automobile according to claim 1, wherein a plurality of downward protrusions are formed on the bottom portion of the suspension frame, and at least one of the downward protrusions is placed at a forward position with respect to that of the steering gear case in the front body.

3. A structure of the front body in an automobile comprising:

a pair of main frames provided in a longitudinal direction of an automobile, each of the main frames having spaced apart through openings therein;

a suspension frame provided on a front side of the main frames and perpendicular thereto, the suspension frame having spaced apart through openings;

a plurality of bolts connecting the main frames and the suspension frame, the through openings of the suspension frame having a diameter which is larger than the diameter of the bolts and the diameter of the through openings of the main frames to permit positioning of the suspension frame relative to the main frames in a longitudinal direction of the automobile body; and a pair of lower control arms, one at each main frame, each of which suspends a wheel from one of the main frames and the suspension frame and each of which has a bush portion attached to a mount bracket provided on the respective main frame and the suspension frame.

4. The structure of a front body of an automobile according to claim 3, wherein the through openings comprise circular holes.

5. The structure of a front body of an automobile according to claim 3, wherein the through openings in the suspension frames are slots.

6. The structure of a front body of an automobile according to claim 3, further comprising a steering gear case, the steering gear case having points of attachment to the suspension frame, at least a part of the steering gear case being placed below a bottom portion of the suspension frame, the suspension frame having a downward protrusion on the bottom portion thereof, the downward protrusion being arranged forward of the steering gear case and forward of the points of attachment of the steering gear case, the downward protrusion having a slanted face that is slanted downward toward a rear portion of the automobile and further having a lowermost end at a position lower than a lowermost end of the steering gear case.

7. The structure of the front body of an automobile according to claim 6, wherein a plurality of downward protrusions are formed on the bottom portion of the suspension frame, and at least one of the downward protrusions is placed at a forward position with respect to that of a steering gear case in the front body.

* * * * *